United States Patent [19]

Madonna et al.

[11] Patent Number: 5,574,464
[45] Date of Patent: Nov. 12, 1996

[54] HIGH-SPEED SWITCHING DEVICE FOR MONOSTATIC IMPULSE RADAR

[75] Inventors: Richard G. Madonna, East Meadow; Gregory H. Vilardi, Huntington Station, both of N.Y.

[73] Assignee: Northrop Grumman Corporation, Los Angeles, Calif.

[21] Appl. No.: 544,369

[22] Filed: Oct. 17, 1995

[51] Int. Cl.$^6$ ............................................. G01S 7/28
[52] U.S. Cl. ....................................... 342/198; 342/203
[58] Field of Search ..................................... 342/175, 198, 342/203, 204

[56] References Cited

U.S. PATENT DOCUMENTS

| | | |
|---|---|---|
| 4,062,010 | 12/1977 | Young et al. |
| 4,904,831 | 2/1990 | Nathanson et al. ........... 200/269 |
| 5,028,971 | 7/1991 | Kim et al. ..................... 357/30 |
| 5,155,352 | 10/1992 | Kim et al. ................... 250/211 J |
| 5,177,486 | 1/1993 | Kim et al. ..................... 342/21 |
| 5,227,621 | 7/1995 | Kim et al. .................. 250/214.1 |

*Primary Examiner*—John B. Sotomayor
*Attorney, Agent, or Firm*—Terry J. Anderson; Karl J. Hoch, Jr.

[57] ABSTRACT

A switching device is provided which uses an array of high-speed photoconductive semiconductor switches laid out in a stripline configuration to achieve a transmitter-to-receiver isolation sufficient to support a monostatic configuration for a high-power, monostatic impulse radar.

42 Claims, 3 Drawing Sheets

HIGH-SPEED SWITCHING DEVICE FOR MONOSTATIC IMPULSE RADAR

BACKGROUND OF THE INVENTION

1. Field of the Invention

This invention generally relates to switching devices for directive communications systems, and more particularly to a device for switching an antenna between a transmitter and receiver of a high-power, monostatic impulse radar system.

2. Description of Related Art

Radar systems may be classified into two general categories according to their geometrical configurations: monostatic and bistatic. Very simply, monostatic radar uses a single antenna to receive and transmit radar signals, while bistatic radar uses separate antennas, usually separated by distance comparable to a predetermined target distance, to accomplish the same.

Monostatic radar is the preferred configuration for target detection purposes for a number of reasons:

1) Monostatic radar, with its ability to scan in a hemispherical volume, is more versatile than bistatic radar, which is, more or less, confined to planar scanning.
2) Monostatic radar, with its single antenna design, is likely to be less expensive to construct and maintain than a bistatic radar system with comparable detection ability.
3) Monostatic radar achieves a dynamic range which is considerably more pronounced than bistatic radar.

One type of radar known as impulse, or ultra-wide band, radar transmits a very high peak pulse a few nanoseconds in duration. For years, radar designers have been trying to construct an operational, high-power, monostatic impulse radar, but have had limited success. At present, except for a few low-powered units operating in the UHF frequency range, impulse radar is confined to a bistatic configuration.

The primary stumbling block to the construction of a high-power, monostatic impulse radar has been the inability of radar designers to develop a switch which can operate at speeds rapid enough to provide adequate isolation between the transmitter and receiver. Without adequate isolation, the transmit pulse of the radar will leak into the receiver and render the system inoperable for target detection purposes.

In recent years, a few attempts have been made to construct a high-speed switch for an impulse radar system. U.S. Pat. Nos. 5,028,971, 5,155,352, and 5,177,486, for example, disclose the use of a photoconductive semiconductor switch (PCSS) to transmit sub-nanosecond pulses for impulse radar. A closer reading of these patents, however, reveals that the PCSS is used to generate sub-nanosecond pulses, not to provide switching between a radar transmitter and receiver.

Thus, a need still exists for a switch, or switching mechanism, which can operate at a speed fast enough to achieve a transmitter-to-receiver isolation sufficient to support a monostatic configuration for a high-power impulse radar.

SUMMARY OF THE INVENTION

It is a principal objective of the present invention to make possible a feat which for so long has eluded the grasp of radar designers: The construction of an operational, high-power, monostatic impulse radar which achieves all of the advantages that a monostatic configuration enjoys over its bistatic counterpart.

It is a second objective of the present invention to achieve the principal objective by providing a switching device which uses an array of high-speed PCSSs to provide the switching speeds necessary to achieve a level of transmitter-to-receiver isolation sufficient to support a monostatic configuration for an impulse radar.

It is a third objective of the present invention to provide a high-speed switching device for a monostatic impulse radar which achieves a transmitter-to-receiver isolation of at least 80 dB.

It is a fourth objective of the present invention to provide a high-speed switching device which, because of its ability to support a monostatic configuration, will enable high-power impulse radar systems to be built at a cost significantly lower than the cost of existing bistatic impulse radar systems.

The foregoing and other objectives of the invention are accomplished by providing a switching device for a monostatic impulse radar which includes a first photoconductive switching circuit formed along a stripline situated between an antenna and a transmitter and a second photoconductive switching circuit formed along a stripline situated between the antenna and a receiver. In operation during a radar transmit mode, the first switching circuit provides an electrical path for allowing radar pulses to pass from the transmitter to the antenna, while the second switching circuit simultaneously isolates the antenna from the receiver. And, during a radar receive mode, the second switching circuit provides an electrical path for allowing reflected radar pulses to pass from the antenna to the receiver, while the first switching circuit means simultaneously isolates the antenna from the transmitter.

A first preferred embodiment of the invention contemplates four PCSSs embedded within a dielectric substrate, which includes on its upper surface a first conducting strip electrically connecting the antenna to the transmitter and a second conducting strip connecting the antenna to the receiver. Three of the PCSSs are vertical switches and the fourth is a lateral switch. One of the vertical PCSSs is formed along the first conducting strip and is used to establish an electrical path between the antenna and transmitter during a radar transmit mode. The other two vertical PCSSs and the lateral PCSS are formed along the second conducting strip and are used to establish an electrical path between the antenna and receiver during a receive mode. A fifth, optional PCSS may be added to provide additional isolation between the receiver and transmitter.

A second embodiment of the invention operates in the same manner using all lateral PCSSs.

DETAILED DESCRIPTION OF THE PREFERRED EMBODIMENTS

Figure 1:
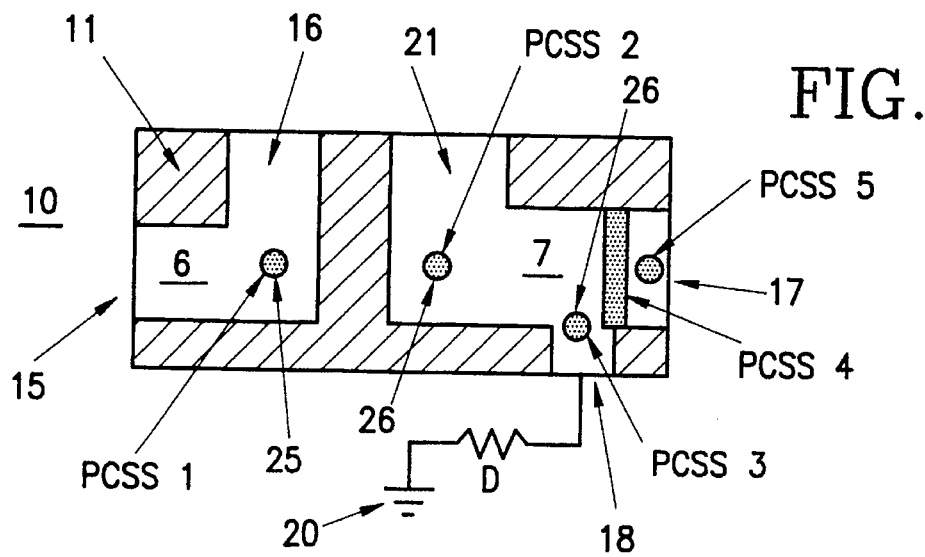
FIG. 1 is a schematic diagram showing a top view of a first preferred embodiment of the high-speed switching device of the present invention.
Figure 2:
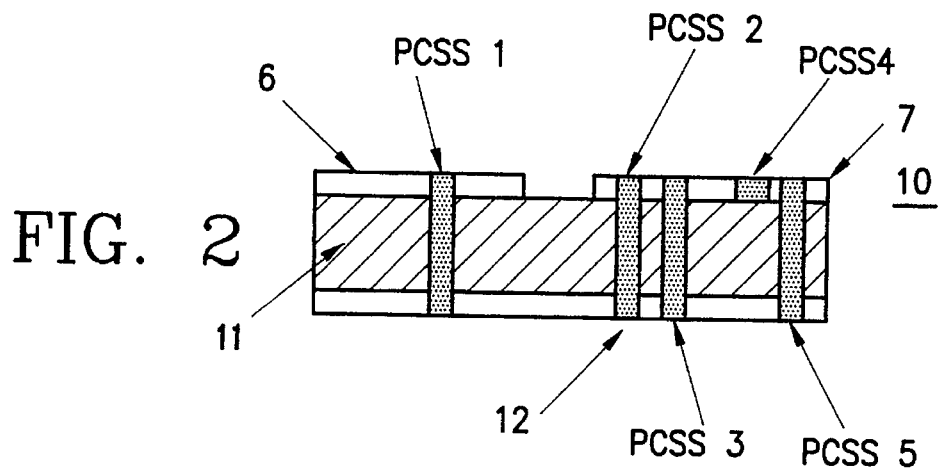
FIG. 2 is a schematic diagram showing a profile view of a first preferred embodiment of the high-speed switching device of the present invention.

Referring to FIGS. 1 and 2, a first preferred embodiment of the switching device of the present invention is formed on a transmission line having a stripline configuration which includes a dielectric substrate 11, a conductive ground plane 12 formed on the lower surface of the substrate, two conducting strips 6 and 7 formed on an upper surface of the substrate, and four PCSSs. A stripline for the present invention is preferable to other types of transmission line configurations for a number of reasons. Most notably, is the fact that striplines are compatible with the use of PCSSs. The same cannot be said for other types of transmission lines. For example, PCSSs have proven to be more difficult to fabricate and operate when used in conjunction with coaxial transmission lines. Also, a stripline inherently has a lower inductance compared with its coaxial counterpart.

Conducting strips 6 and 7 are electrically insulated from one another on the upper surface of the dielectric. Conducting strip 6 has one end 15 which is electrically connected to a radar transmitter (not shown) and another end 16 connected to an antenna (not shown). Conducting strip 7 has an end 17 which is electrically connected to a radar receiver (not shown), another end 18 connected to a dummy load D, which itself is connected to a ground 20, and an end 21 connected to the antenna.

The four photoconductive semiconductor switches consist of three vertical switches (hereinafter labeled PCSS 1, PCSS 2, and PCSS 3) and one lateral switch (hereinafter labeled PCSS 4). Each of the vertical switches is constructed from a cylinder of semiconductor material having Ohmic contacts at both ends of the cylinder. PCSS 1 extends vertically through an aperture 25 in the substrate and has two ends in electrical contact with ground plane 12 and conducting strip 6. PCSS 2 and PCSS 3 extend vertically through apertures 26 in the substrate and each have two ends in electrical contact with ground plane 12 and conducting strip 7. PCSS 4 is a flat, rectangular section of semiconductor material which has Ohmic contacts at its ends and which extends laterally across the upper surface of the substrate in a position bridging the end of conducting strip 7 which is electrically connected to the receiver.

An optional, vertical switch PCSS 5 may be added to the receiver side of the stripline to provide additional isolation between the transmitter and receiver. Like the second and third vertical switches, PCSS 5 extends vertically through the substrate and has ends in electrical contact with the ground plane and conducting strip 7.

All of the switches used in switching device 10 are non-ideal switches which exhibit an on-state resistance when activated by a laser beam and an off-state resistance when left in an undisturbed condition. On-state resistances typically lie in a range between 0.5 and 5 $\Omega$ and off-state resistances typically lie in a range between 4 and 10 k$\Omega$. (The resistance values expressed were achieved in laboratory trials and are in no way intended to limit the scope of the invention, For example, the on-state resistance value mentioned could easily be a factor of 10 or more smaller and the off-state resistance values could be several orders of magnitude larger, both depending on factors such as the semiconductor material used to fabricate the switches and the intensity of the laser beam used to activate them.)

Each switch is activated, i.e., converted to an on-state, when a laser beam is directed onto the semiconductor material between the Ohmic contacts. The laser beam causes photocarriers within the semiconductor material to become excited, which, in turn, causes the resistance of the switch to decrease to within the range previously mentioned. Switches which operate in this fashion are disclosed, for example, in U.S. Pat. No. 5,155,352.

The operation of the switching device of the present invention will now be explained with reference to the equivalent resistor networks shown in FIGS. 4 and 5. In both figures, the optional fifth switch is included and each of the switches are represented as resistors. To facilitate switching of the antenna between the transmitter and receiver, each of the switches must assume a different switching state depending upon whether the radar is in a transmit mode or a receive mode.

Figure 4:
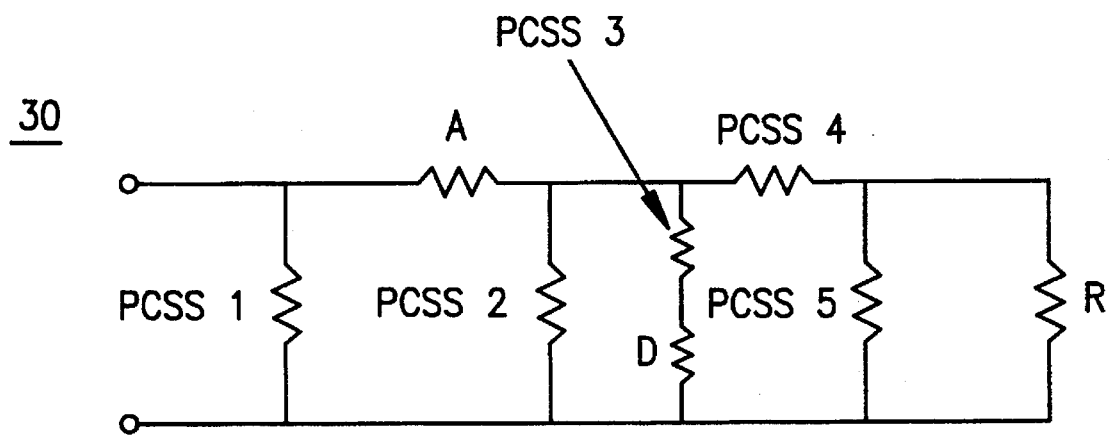
FIG. 4 is a diagram of an equivalent resistor network of the high-speed switching device of the present invention operating in the transmit mode.

FIG. 4 shows an equivalent resistor network 30 of the switching device of the present invention operating in the transmit mode. Resistor network 30 includes five resistors representing the five PCSSs, a resistor A representing the antenna, a receiver R representing the receiver, and a dummy load D having a resistance value equal to the receiver impedance. On the transmitter side of the circuit, PCSS 1 is connected in parallel with the transmitter and the antenna. And, on the receiver side of the circuit, PCSS 2 is connected in parallel with the antenna, PCSS 3 is connected in parallel with PCSS 2 and in series with the dummy load, PCSS 4 connected in parallel with PCSS 3, and finally PCSS 5 is connected in parallel with PCSS 4 and the receiver.

During a radar transmit mode, the switches must assume states that will establish an electrical path between the transmitter and antenna and, at the same time, isolate the antenna from the receiver. This is accomplished by closing PCSSs 2, 3, and 5 (activating them so that they will exhibit an on-state resistance) and by opening PCSSs 1 and 4 (leaving them in an inactive condition so that they will exhibit an off-state resistance). The opening of PCSS 1 allows current (a transmit pulse) to pass from the transmitter to the antenna. The remaining switches cooperate to short the receiver from the antenna and to prevent any transmitter current from reaching the receiver. The closing of PCSS 2 and PCSS 3, for example, diverts a large portion of the transmitter current away from the receiver side of the circuit and into the dummy load. The opening of PCSS 4 opens the connection between the receiver and the remainder of the circuit and the closing of PCSS 5 shorts the receiver, which shunts all of the remaining current, and hence power, away from the receiver.

Figure 3:
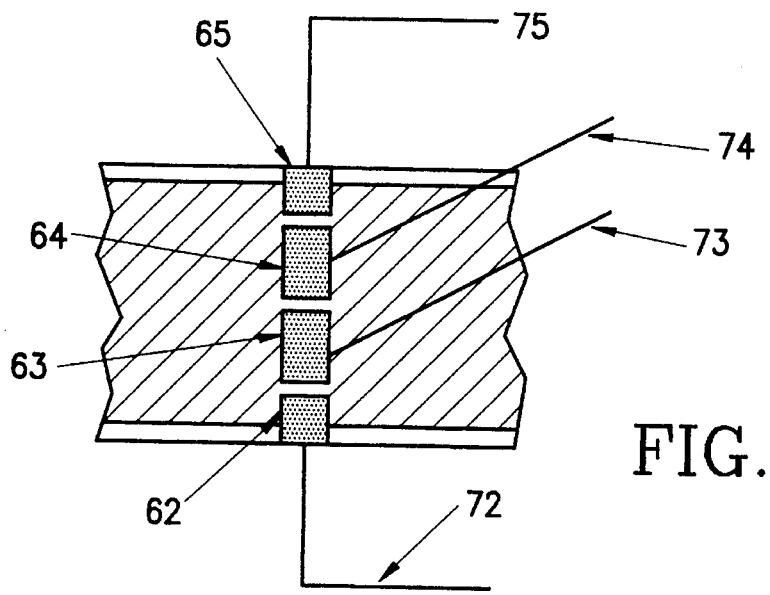
FIG. 3 is a schematic diagram showing a fiber-optic cable used to deliver the excitation energy required to switch to activate a PCSS used in conjunction with the high-speed switching device of the present invention.

During the transmit mode, PCSS 1 in its off-state, must hold off a large voltage on the order of tens to hundreds of kilovolts in its off-state. To accomplish this, PCSS 1 is constructed from a number of smaller photoconductive semiconductor switches 62, 63, 64, and 65 stacked one on top of the other. In order to activate PCSS 1, each of the smaller photoconductive semiconductor switches must be individually and simultaneously activated by separate laser beams delivered by fiber-optic cables 72, 73, 74, and 75, as shown in FIG. 3.

Figure 5:
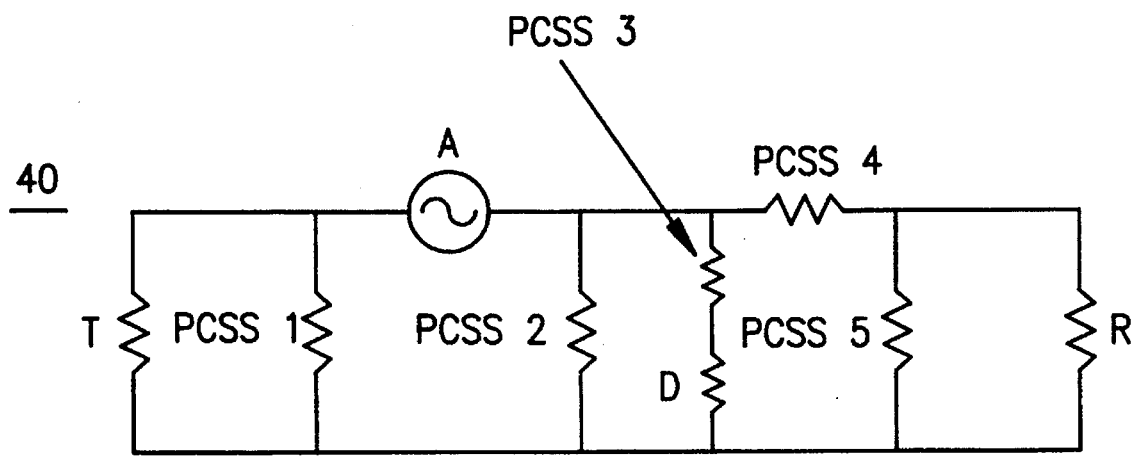
FIG. 5 is a diagram of an equivalent resistor network of the high-speed switching device of the present invention operating in the receive mode.

FIG. 5 shows an equivalent resistor network 40 of the switching device of the present invention operating in the receive mode. Resistor network 40 has the same architecture as resistor network 30 except that the antenna is represented as a voltage source A and the transmitter is represented as a resistor T.

During a radar receive mode, the switches must assume a configuration that will establish an electrical path between the antenna and the receiver and, at the same time, isolate the antenna from the transmitter. This is accomplished by closing PCSSs 1 and 4 (activating them so that they will exhibit an on-state resistance) and by opening PCSSs 2, 3, and 5 (leaving them an inactive condition so that they will exhibit an off-state resistance). The closing of PCSS 1 effectively removes the transmitter from the circuit, the opening of PCSS 3 removes the dummy load from the circuit, and the opening of PCSS 2, the closing of PCSS 4, and the opening of PCSS 5 allow current (a signal received by the antenna) to flow from the antenna to the receiver.

In order to ensure proper operation of the switching device while in the receive mode, PCSSs 1 and 4 must be able to remain in an on-state for a relatively long period of time, typically from 1 microsecond to several milliseconds. The long "on-time" requirement may be fulfilled either by using an activating laser beam which has a long pulse length or a semiconductor material having a long carrier lifetime, such as silicon. If a material with a long carrier lifetime is used, a high-intensity, activating laser beam can be used to generate a number of photoelectrons sufficient to maintain the switch in the on-state for the prescribed time period. This type of switch would then be "refreshed" by using laser pulses having a duration shorter than the photo-carrier lifetime. The photo-carrier lifetime of silicon, for example, lies in a range between 10 and 100 microseconds and the refresh rate would lie between 20 kHz to 200 kHz.

PCSSs 2, 3, and 5 have no special operating requirements except that they be fast-opening and fast-closing. Because it has a short photo-carrier lifetime and a high off-state resistance, GaAs is one such semiconductor material which can fulfill these requirements.

The rapid switching speeds of the PCSSs allow the switching device of the present invention to shift the antenna between transmit and receive modes within a very short period of time, which typically can be measured on a nanosecond time scale. The ability to switch the antenna at such rapid speeds gives the switching device a level of isolation between the transmitter and the receiver sufficient to support the monostatic configuration of the radar. The isolation generated by the switching device of the present invention operating in the transmit mode is computed according to the following equations:

$$I(dB) = 10\log\left\{ \frac{R_t}{R_x} \left( \frac{R_{e3}}{R_a + R_{e3}} \right)^2 \left[ \frac{R_4 R_x}{R_4(R_5 + R_x) + R_5 R_x} \right]^2 \right\}$$

where:

$R_x$ is the receiver impedance $R_1$ is the off state resistance of PCSS 1

$R_t$ is the total equivalent impedance of the circuit given by $$R_t = \frac{R_1(R_a + R_{e3})}{R_1 + R_a + R_{e3}}$$

-continued $$R_{e3} = \frac{R_2 R_5 (R_3 + R_x)\left(R_4 + \frac{R_5 R_x}{R_5 + R_x}\right)}{R_2 R_5 \left(R_4 + \frac{R_5 R_x}{R_5 + R_x}\right) + (R_3 + R_x)\left(R_4 + \frac{R_5 R_x}{R_5 + R_x}\right) R_2 + R_5 (R_3 + R_x)\left(R_4 + \frac{R_5 R_x}{R_5 + R_x}\right) + R_2 R_5 (R_3 + R_x)}$$

$R_a$ is the antenna impedance $R_2$ is the on state resistance of PCSS 2.

$R_3$ is the off state resistance of PCSS 3.

$R_4$ is the on state resistance of PCSS 4.

$R_5$ is the off state resistance of PCSS 5.

If the on- and off-state resistances of the PCSSs are 5 Ω and 4 kΩ, respectively, the switching device can achieve a transmitter-to-receiver isolation of 80 dB can be achieved. And, if the on- and off-state resistances of the PCSSs are 0.5 Ω and 10 kΩ, respectively, a transmitter-to-receiver isolation of 100 dB can be achieved.

Figure 6:
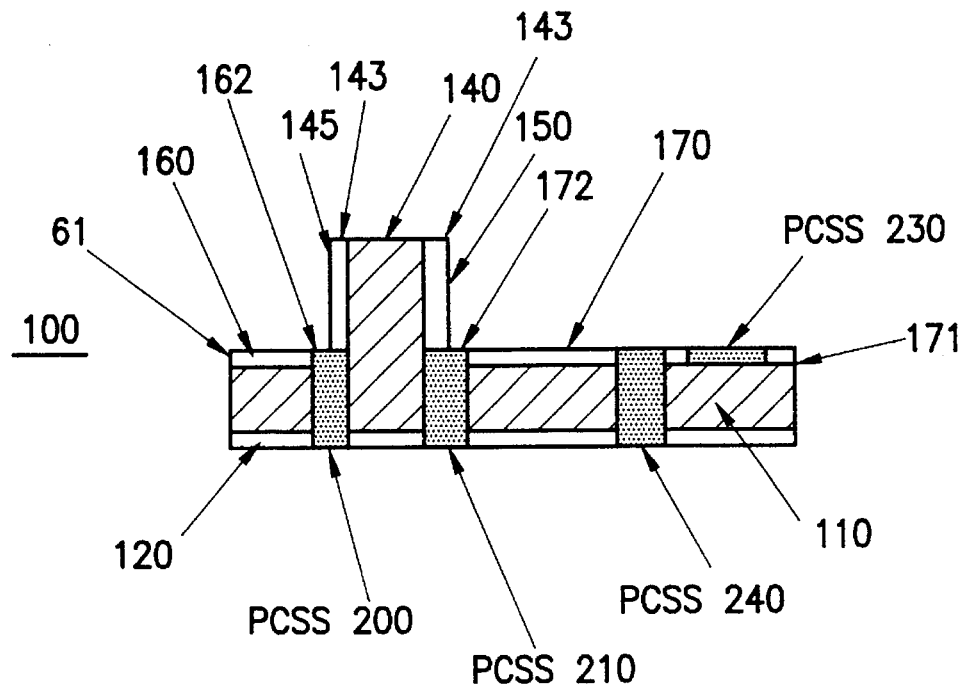
FIG. 6 is a schematic diagram showing a top view of a second preferred embodiment of the high-speed switching device of the present invention.
Figure 7:
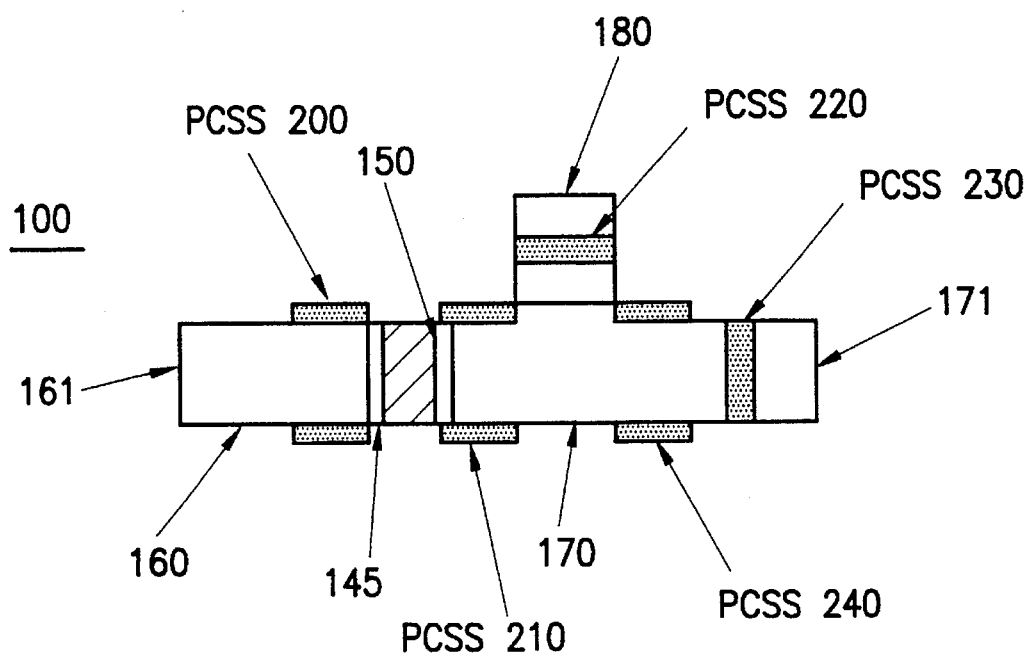
FIG. 7 is a schematic diagram showing a profile view of a second preferred embodiment of the high-speed switching device of the present invention.

Referring to FIGS. 6 and 7, a second preferred embodiment of the switching device 100 of the present invention includes the following components laid out in a stripline configuration: a dielectric substrate 110, a conductive ground plane 120 formed on a lower surface of the substrate, a first conductive portion 160 and a second conductive portion 170 formed on an upper surface of the substrate, and four high-speed lateral photoconductive semiconductor switches PCSS 200, PCSS 210, PCSS 220, and PCSS 230 which have a structure and method of operation like PCSS 5 described above. The second conductive portion has an end 180 electrically connected to a dummy load. And, if desired, an optional, fifth lateral switch PCSS 240 may be added to provide additional isolation between the transmitter and the receiver.

Dielectric substrate 110 includes a raised portion 140 which is sandwiched between two additional conductive portions 145 and 150. Distal ends 143 of conductive portions 145 and 150 are electrically connected to the antenna.

Conductive portion 160 has one end 161 electrically connected to a radar transmitter (not shown) and another end 162 connected to the antenna via conductive portion 145. Similarly, conductive portion 170 has one end 171 electrically connected to a radar receiver (not shown) and another end 172 connected to the antenna via conductive portion 150. Conductive portions 160 and 170 are electrically isolated from one another on the upper surface of the dielectric substrate.

The second embodiment of the present invention operates in the same way the first embodiment operates with reference to resistor networks 30 and 40 depicted in FIGS. 4 and 5.

In addition to the embodiments discussed above, the switching device of the present invention may be used to switch an antenna between two transmitters, two receivers, or any combination thereof.

Other modifications and variations to the invention will be apparent to those skilled in the art from the foregoing disclosure and teachings. Thus, while only certain embodiments of the invention have been specifically described herein, numerous modifications may be made thereto without departing from the spirit and scope of the invention.

I claim:

1. A switching device for switching an antenna between a transmitter and a receiver in an impulse radar system, comprising:

a first switching circuit means formed along a stripline situated between the antenna and the transmitter;

a second switching circuit means formed along a stripline situated between the antenna and the receiver;

wherein during a radar transmit mode the first switching circuit means provides an electrical path for allowing radar pulses to pass from the transmitter to the antenna and the second switching circuit means simultaneously isolates the antenna from the receiver; and wherein during a radar receive mode the second switching circuit means provides an electrical path for allowing reflected radar pulses to pass from the antenna to the receiver and the first switching circuit means simultaneously isolates the antenna from the transmitter.

2. The switching device recited in claim 1, wherein the first switching circuit means includes a first PCSS connected in parallel with the transmitter and the antenna, said first PCSS exhibiting an off-state resistance during a radar transmit mode and an on-state resistance during a radar receive mode.

3. The switching device recited in claim 1, wherein the second switching circuit means includes a second PCSS connected in parallel with the antenna, a third PCSS connected in series with the receiver, and a fourth PCSS connected in parallel with both the second PCSS and the third PCSS and in series with a dummy load, said second and fourth PCSSs exhibiting an on-state resistance and said third PCSS exhibiting an off-state resistance during a radar transmit mode and said second and fourth PCSSs exhibiting an off-state resistance and said third PCSS exhibiting an on-state resistance during a radar receive mode.

4. The switching device recited in claim 1, wherein the stripline situated between the antenna and the transmitter and the stripline situated between the antenna and the receiver reside on a common dielectric substrate.

5. The switching device recited in claim 3, wherein the second switching circuit means includes a fifth PCSS connected in parallel with the receiver and the third PCSS to provide additional isolation between the antenna and the receiver during a radar transmit mode, said fifth PCSS exhibiting an on-state resistance during a radar transmit mode and an off-state resistance during a radar receive mode.

6. The switching device recited in claim 2, wherein the first PCSS is a vertical photoconductive semiconductor switch.

7. The switching device recited in claim 3, wherein the second and fourth PCSSs are vertical photoconductive semiconductor switches and the third PCSS is a lateral photoconductive semiconductor switch.

8. The switching device recited in claim 5, wherein the fifth PCSS is a vertical photoconductive semiconductor switch.

9. The switching device recited in claim 1, wherein the first switching circuit means includes a first PCSS connected in parallel with the transmitter and the antenna and the second switching circuit means includes a second PCSS connected in parallel with the antenna, a third PCSS connected in series with the receiver, and a fourth PCSS connected in parallel with both the second PCSS and the third PCSS and in series with a dummy load.

10. The switching device recited in claim 9, wherein the first PCSS exhibits an off-state resistance during a radar transmit mode and an on-state resistance during a radar receive mode, and wherein the second and fourth PCSSs exhibit an on-state resistance and the third PCSS exhibits an off-state resistance during a radar transmit mode and the second and fourth PCSSs exhibit an off-state resistance and the third PCSS exhibits an on-state resistance during a radar receive mode.

11. The switching device recited in claim 9, wherein the second switching circuit means includes a fifth PCSS connected in parallel with the receiver and the third PCSS to provide additional isolation between the antenna and the receiver during a radar transmit mode.

12. The switching device recited in claim 11, wherein the fifth PCSS exhibits an on-state resistance during a radar transmit mode and an off-state resistance during a radar receive mode.

13. The switching device recited in claim 12, wherein the first, second, third, fourth, and fifth PCSSs exhibit a resistance residing in a range between 0.5 and 5 $\Omega$ when in an on-state and a resistance residing in a range between 4 and 10 k$\Omega$ when in an off-state, said on-state and off-state resistance values providing a transmitter-to-receiver isolation residing in a range between 80 and 100 dB.

14. The switching device recited in claim 9, wherein the first, second, and fourth PCSSs are a vertical photoconductive semiconductor switches and the third PCSS is a lateral photoconductive semiconductor switch.

15. The switching device recited in claim 11, wherein the first, second, fourth, and fifth PCSSs are a vertical photoconductive semiconductor switches and the third PCSS is a lateral photoconductive semiconductor switch.

16. The switching device recited in claim 9, wherein the first, second, third, and fourth PCSSs are lateral photoconductive semiconductor switches.

17. The switching device recited in claim 11, wherein the first, second, third, fourth, and fifth PCSSs are lateral photoconductive semiconductor switches.

18. The switching device recited in claim 11, wherein fiber-optic cables are used to provide the excitation radiation required to activate said first, second, third, fourth, and fifth PCSSs.

19. The switching device recited in claim 1, wherein the switching of the antenna between the transmitter and receiver takes place on a nanosecond time scale.

20. The switching device recited in claim 9, wherein the second and fourth PCSSs are made from GaAs.

21. The switching device recited in claim 9, wherein the first and third PCSSs are made from silicon.

22. The switching device recited in claim 11, wherein the fifth PCSS is made from GaAs.

23. A switching device for switching an antenna between a transmitter and a receiver in an impulse radar system, comprising:

a dielectric substrate;

a conductive ground plane formed on a lower surface of the substrate;

first and second conducting strips formed on an upper surface of the substrate, said first conducting strip electrically connecting the transmitter to the antenna and said second conducting strip electrically connecting the receiver to the antenna;

a first PCSS in electrical contact with the ground plane and the first conducting strip;

a second PCSS in electrical contact with the ground plane and the second conducting strip;

a third PCSS in electrical contact with the ground plane and the second conducting strip;

a fourth, lateral PCSS extending laterally across the upper surface of the substrate and bridging a portion of the second conductive portion electrically connected to the receiver;

wherein during a radar transmit mode the second and third PCSSs are switched to an on-state to provide an electrical path between the transmitter and the antenna and the first and fourth PCSSs are switched to an off-state to electrically disconnect the receiver from the antenna; and wherein during a radar receive mode the first and fourth PCSSs are switched to an on-state to provide an electrical path between the antenna and the receiver and the second and third PCSSs are left in an off-state to electrically disconnect the transmitter from the antenna.

24. The high-speed switching device recited in claim 23, wherein the first, second, and third PCSSs are vertical switches embedded in apertures in the substrate.

25. The high-speed switching device recited in claim 23, further comprising:

a fifth, vertical PCSS positioned between the lateral PCSS and the receiver to provide additional isolation between the transmitter and receiver, said fifth PCSS being switched to an on-state during a transmit mode and to an off-state during a receive mode.

26. The high-speed switching device recited in claim 23, wherein said first PCSS is constructed from a plurality of PCSSs stacked vertically one on top of the other.

27. The high-speed switching device recited in claim 25, where said first, second, third, fourth, and fifth PCSSs are non-ideal switches that exhibit an on-state resistance of between 0.5 and 5 Ω and an off-state resistance of between 4 and 10 kΩ, said on- and off-state resistances enabling said switching network to provide isolation between the transmitter and receiver of between 80 dB and 100 dB.

28. The high-speed switching device of claim 23, wherein separate fiber-optic cables are used to deliver laser beams for activating each of said PCSSs.

29. The high-speed switching device of claim 23, where switching between the transmitter and receiver is achieved on a nanosecond time scale.

30. The high-speed switching device of claim 23, wherein said switching device has a stripline configuration.

31. The high-speed switching device of claim 23, wherein said second and third PCSSs are made from GaAs.

32. The high-speed switching device of claim 23, wherein said first and fourth PCSSs are made from silicon.

33. The high-speed switching device of claim 25, wherein said fifth PCSS is made from GaAs.

34. A high-speed switching device for switching an antenna between a transmitter and a receiver of an impulse radar, comprising:

an insulation substrate having an upper surface and a lower surface;

a conductor formed on the lower surface of the substrate;

a first conductive portion formed on the upper surface of the substrate and having one end electrically connected to the transmitter and another end electrically connected to the antenna; a second conductive portion formed on the upper surface of the substrate, said second conductive portion being electrically insulated from said first upper portion and having one end electrically connected to the receiver, another end electrically connected to a dummy load connected to ground, and another end electrically connected to the antenna;

a first lateral PCSS having ends in electrical contact with the conductor and the first conductive portion respectively;

a second lateral PCSS having ends in electrical connection with the conductor and the second conductive portion respectively;

a third lateral PCSS extending across the upper surface of said substrate and bridging a portion of the end of said second conductive portion electrically connected to the dummy load;

a fourth lateral PCSS extending across the upper surface of said substrate and bridging a portion of the end of said second conductive portion electrically connected to said receiver;

wherein during a radar transmit mode the second and third PCSSs are switched to an ON-state to provide an electrical path between the transmitter and the antenna and the first and fourth PCSSs are left in an OFF-state to electrically disconnect the receiver from the antenna; and wherein during a radar receive mode the first and fourth PCSSs are switched to an ON-state to provide an electrical path between the antenna and the receiver and the second and third PCSSs are left in an OFF-state to electrically disconnect the transmitter from the antenna.

35. The high-speed switching device recited in claim 34, further comprising:

a fifth lateral PCSS positioned between said first and fourth PCSSs to provide additional isolation between the transmitter and the receiver, said fifth PCSS being switched to an on-state during a transmit mode and to an off-state during a receive mode.

36. The high-speed switching device recited in claim 34, wherein said first, second, third, fourth, and fifth PCSSs are non-ideal switches that exhibit an on-state resistance in the range between 0.5 and 5 Ω and an off-state resistance in the range between 4 and 10 kΩ, said on- and off-state resistances exhibited by said PCSSs providing an isolation between the transmitter and receiver in the range between 80 dB and 100 dB.

37. The high-speed switching device recited in claim 34, wherein separate fiber-optic cables are used to deliver laser beams for activating each of said PCSSs.

38. The high-speed switching device of claim 34, wherein switching between the transmitter and receiver takes place on a nanosecond time scale.

39. The high-speed switching device of claim 34, wherein the switching device is laid out in a stripline configuration.

40. The high-speed switching device of claim 34, wherein said second PCSS and said third PCSS are made from GaAs.

41. The high-speed switching device of claim 34, wherein said first PCSS and said fourth PCSS are made from silicon.

42. The high-speed switching device of claim 35, wherein said fifth PCSS is made from GaAs.

* * * * *